United States Patent [19]

Gregory

[11] Patent Number: 5,425,435
[45] Date of Patent: Jun. 20, 1995

[54] BRAKE SYSTEM FOR DRILLING EQUIPMENT

[75] Inventor: Truman L. Gregory, Odessa, Tex.

[73] Assignee: Gregory Rig Service & Sales, Inc., Odessa, Tex.

[21] Appl. No.: 357,523

[22] Filed: Dec. 15, 1994

Related U.S. Application Data

[63] Continuation of Ser. No. 122,325, Sep. 15, 1993, abandoned.

[51] Int. Cl.⁶ .................... F16D 51/00; B66D 5/26
[52] U.S. Cl. .................... 188/77 W; 188/72.1; 188/264 A; 254/379
[58] Field of Search ............ 188/170, 70 R, 70 B, 188/77 W, 71.1, 72.4, 72.9, 105, 106 F, 106 R, 83, 72.1, 71.6, 264 A; 254/378, 379, 358; 242/75.41

[56] References Cited

U.S. PATENT DOCUMENTS

| | | | |
|---|---|---|---|
| 1,688,599 | 10/1928 | Sage et al. | 254/378 X |
| 1,746,372 | 2/1930 | Turnbull et al. | |
| 1,805,482 | 5/1931 | Dyrr | 254/378 X |
| 1,915,547 | 6/1933 | North et al. | |
| 1,985,889 | 1/1935 | De La Mater et al. | |
| 1,992,910 | 2/1935 | De La Mater | |
| 1,992,911 | 2/1935 | De La Mater | |
| 1,992,912 | 2/1935 | De La Mater | 188/105 |
| 2,061,866 | 11/1936 | De La Mater | |
| 2,113,109 | 4/1938 | De La Mater | |
| 2,126,751 | 8/1938 | De La Mater | |
| 2,170,128 | 8/1938 | De La Mater | |
| 2,282,615 | 5/1942 | Spalding | 188/151 R |
| 2,287,130 | 6/1942 | Ramey | |
| 2,371,857 | 3/1945 | Stevenson | 188/105 |
| 2,464,469 | 3/1949 | Termolada | 188/151 |
| 2,502,710 | 4/1950 | Duncan | 254/173 |
| 2,683,020 | 7/1954 | Nickle | 254/173 |
| 2,733,778 | 2/1956 | De La Mater et al. | |
| 2,786,552 | 3/1957 | De La Mater et al. | |
| 2,795,301 | 6/1957 | Driver | 188/189 |
| 2,847,094 | 8/1958 | Abraham | 188/151 |
| 3,016,991 | 1/1962 | Lyne | |
| 3,101,828 | 8/1963 | Wilson | 192/139 |
| 3,488,036 | 1/1970 | Feger et al. | 254/379 X |
| 3,627,084 | 12/1971 | Benedek | 188/105 |
| 3,815,471 | 6/1974 | Kobelt | 91/189 |
| 3,860,097 | 1/1975 | Braschler et al. | 188/296 |
| 3,945,473 | 3/1976 | Prather et al. | 188/296 |
| 3,964,692 | 6/1976 | Pendleton | 242/75.41 X |
| 3,986,584 | 10/1976 | Wright et al. | 188/71.8 |
| 4,013,148 | 3/1977 | Kobelt | 188/264 D |
| 4,018,140 | 4/1977 | Engle | 92/31 |
| 4,060,153 | 11/1977 | Kobelt | 188/72.6 |
| 4,108,285 | 8/1978 | Kobelt | 188/72.6 |
| 4,121,697 | 10/1978 | Kobelt et al. | 188/72.7 |
| 4,164,993 | 8/1979 | Kobelt | 188/218 X |
| 4,177,973 | 12/1979 | Miller et al. | 188/170 X |
| 4,236,608 | 12/1980 | Kobelt | 188/43 |
| 4,393,962 | 7/1983 | Kobelt | 188/72.6 |
| 4,434,971 | 3/1984 | Cordrey | 254/273 |
| 4,572,335 | 2/1986 | Kobelt | 188/72.1 |
| 4,696,377 | 9/1987 | Richardson et al. | 188/170 |
| 4,751,969 | 6/1988 | Klaeger | 254/379 X |
| 4,903,801 | 2/1990 | Kobelt | 188/218 X |

OTHER PUBLICATIONS

McGraw-Hill Encyclopedia of Science & Technology, Copyright © 1982, 1977, 1971, 1966, 1960 by McGraw-Hill, Inc., Definition of "Brake" (pp. 411-413 and cover and inside sheet, 5 pages.

"A Primer of Oilwell Driling", Fourth Edition, by Ron Baker, published by Petroleum Extension Service, The (List continued on next page.)

Primary Examiner—Robert J. Oberleitner
Assistant Examiner—Peter M. Poon
Attorney, Agent, or Firm—Pravel, Hewitt, Kimball & Krieger

[57] ABSTRACT

A brake system for controlling a winch cable for an oil well drilling or servicing operation includes a main external contracting band brake for stopping the cable and an auxiliary disk brake for controlling the speed the cable unwinds from the winch so as to control the descent of a load on the cable.

22 Claims, 3 Drawing Sheets

OTHER PUBLICATIONS

University of Texas at Austin, Autsin, Tex., in cooperation with International Association of Drilling Contractors, Houston, Tex., 1979 © 1979 by The University of Texas at Austin, (pp. 33-37 an cover page, 7 pages total.
Brochure: J. Kobelt Manufacturing Co. Ltd., Pneumatic Controls Disc Brakes and Mechanical Controls, (pp. 1-5).
Brochure: J. Kobelt Manufacturing Company Limited, air actuated fail safe Industrial Disc Brakes (pp. 1-4).
Galaxy of Canada main disk brake with auxiliary hydromatic brake as disclosed in Background of Invention.
Catalog HB-9-75 entitled: Description Installation & Operation of the Hydromatic Brake, published by Parmac, Inc. of Coffeyville, Kansas (cover and rear pages and pp. 1-24-26 pages total).
Catalog HB1-77 entitled: Hydromatic ® Brakes and Hydrotarders ® published by Parmac, Inc. of Coffeyville, Kansas (pp. 1-62.).
Inside and outside of Parmac, Inc.'s cover with performance chart for 202 Hydromatic brake-indirect drive. Note: on inside of cover are listed U.S. and foreign patents. All listed U.S. patents have been provided and listed in the PTO-1449. Applicant does not have copies of the listed foreign patents (pp. 1-3).

BRAKE SYSTEM FOR DRILLING EQUIPMENT

This is a continuation of application Ser. No. 08/122,325 filed on Sept. 15, 1993, now abandoned.

FIELD OF THE INVENTION

This invention relates to a brake system for use with a winch and, more particularly, to a brake system having a main band brake used in combination with an auxiliary disk brake to regulate or control the speed of descent of a load in an oil well drilling or servicing operation.

BACKGROUND OF THE INVENTION

Long ago, the use of a single brake to provide both the main braking of the load and to control the descent of heavy strings of pipe in oil well drilling and servicing operations proved to be unsatisfactory. Since then, a brake system having both a main and an auxiliary brake has been used in oil well drilling and servicing operations to control the winch or drawwork when heavy strings of pipe are being lowered into the borehole in the earth.

Experienced oil well operators prefer the band brake as the main brake since it allows the operator to "feel" the loading. For example, any sudden decrease in the loading "felt" in the band brake is an indication to the operator that an obstruction has been hit in the borehole or that the load has reached the bottom of the borehole. The use of an auxiliary hydrodynamic brake has increased over the years. Parmac, Inc. of Coffeyville, Kans. sells an auxiliary hydrodynamic brake used with a conventional band brake under the trademarks "Hydromatic" or "Hydrotarder".

However, a conventional auxiliary hydrodynamic brake requires a fluid supply ranging from 300–500 gallons for operation of the brake. Therefore, using a system with an auxiliary hydrodynamic brake increases the total weight of the brake system at least 2400 lbs. for a normal 300 gallon tank. For a vehicle moving the well servicing equipment including the brake system from one location to another this could make the difference between complying with public road and bridge weight restrictions. Also, the preferred fluid used in a hydrodynamic brake is a water and antifreeze mixture. In recent years, environmental concerns and regulations have created a toxic waste disposal problem of this type of mixture, as well as concerns over accidental spills.

Other known brake systems in oil well servicing operations include a main disk brake sold by Galaxy of Canada in combination with an auxiliary hydrodynamic brake. U.S. Pat. No. 1,746,372 discloses an elevator brake system using a main external shoe friction brake in combination with an auxiliary hydrodynamic brake.

U.S. Pat. Nos. 1,985,889; 1,992,910; 1,992,911 and 1,992,912 disclose the use of an auxiliary hydrodynamic brake to control the speed of descent of a loaded winch or drawworks of a rotary drill rig while the load is stopped or held in the desired position by a main mechanical or solid friction brake. U.S. Pat. Nos. 1,985,889; 1,992,910; 1,992,911; and 1,992,912 are incorporated herein by reference for all purposes. U.S. Pat. No. 1,985,889 also discloses that the hydrodynamic brake may be mounted on the primary shaft or mounted on an auxiliary shaft. In particular, U.S. Pat. Nos. 1,992,910; 1,992,911 and 1,992,912 disclose a brake system for drilling equipment where a main external contracting band brake or "prony" brake is used for stopping the load and/or holding it at a desired position. This external contracting band brake is used in combination with an auxiliary hydrodynamic brake for controlling the speed of descent of cables employed with oil well drilling equipment.

U.S. Pat. Nos. 2,113,109; 2,126,751; 2,170,128; and 2,287,130 disclose an auxiliary hydrodynamic brake used on heavy vehicles, such as trucks and buses. These hydrodynamic brakes are used in combination with the conventional friction brakes on a vehicle used to bring the vehicle to a complete stop. The auxiliary hydrodynamic brake is adapted for retarding the movement of the vehicle and/or for determining a maximum rate of movement. For example, the hydrodynamic brake used in combination with the conventional friction brakes is intended to limit the speed of heavy vehicles when descending grades, as in hilly and mountainous country, without the necessity of the driver having to constantly employ the conventional friction brakes for this purpose.

No where in the prior art has a preferred main band brake been used in combination with an auxiliary disk brake where the disk brake is used for controlling the speed of descent of a winch cable employed with oil well drilling or servicing equipment. A brake system for an oil well rig using a conventional band brake with an auxiliary disk brake would provide ease of maintenance and repair. Also, the disk brake would not have the problem of liquid seals leaking nor would rotors or stators deteriorate as in the hydrodynamic brake.

Moreover, an auxiliary disk brake would remove environmental concerns of toxic waste disposal and accidental spills. The auxiliary disk brake would also reduce the weight of the brake system to comply with road and bridge restrictions and facilitate moving the brake system to locations where transportation is generally difficult.

SUMMARY OF THE INVENTION

A brake system for controlling a cable on a winch used in an oil well drilling or servicing operation includes a main external contracting band brake for stopping the cable and an auxiliary disk brake for controlling the speed the cable unwinds from the winch to control the descent of the load on the cable. A remote control valve is used to apply the disk brake and the air pressure to the disk brake can be regulated to correspond to the load on the cable. The main band brake and auxiliary disk brake can be positioned on the same shaft or, alternatively, the band brake could be mounted on one shaft and the disk brake mounted on another shaft with the shafts interengaged by a chain and sprocket assembly.

BRIEF DESCRIPTION OF THE DRAWINGS

The objects, advantages, and features of the invention will become more apparent by reference to the drawings which are appended hereto and wherein like numerals indicate like parts and wherein an illustrated embodiment of the invention is shown, of which.

DETAILED DESCRIPTION OF PREFERRED EMBODIMENT

The brake system of the present invention, generally indicated at 10, includes a main band brake, generally indicated at 12, and an auxiliary disk brake, generally indicated at 14.

Figure 1:
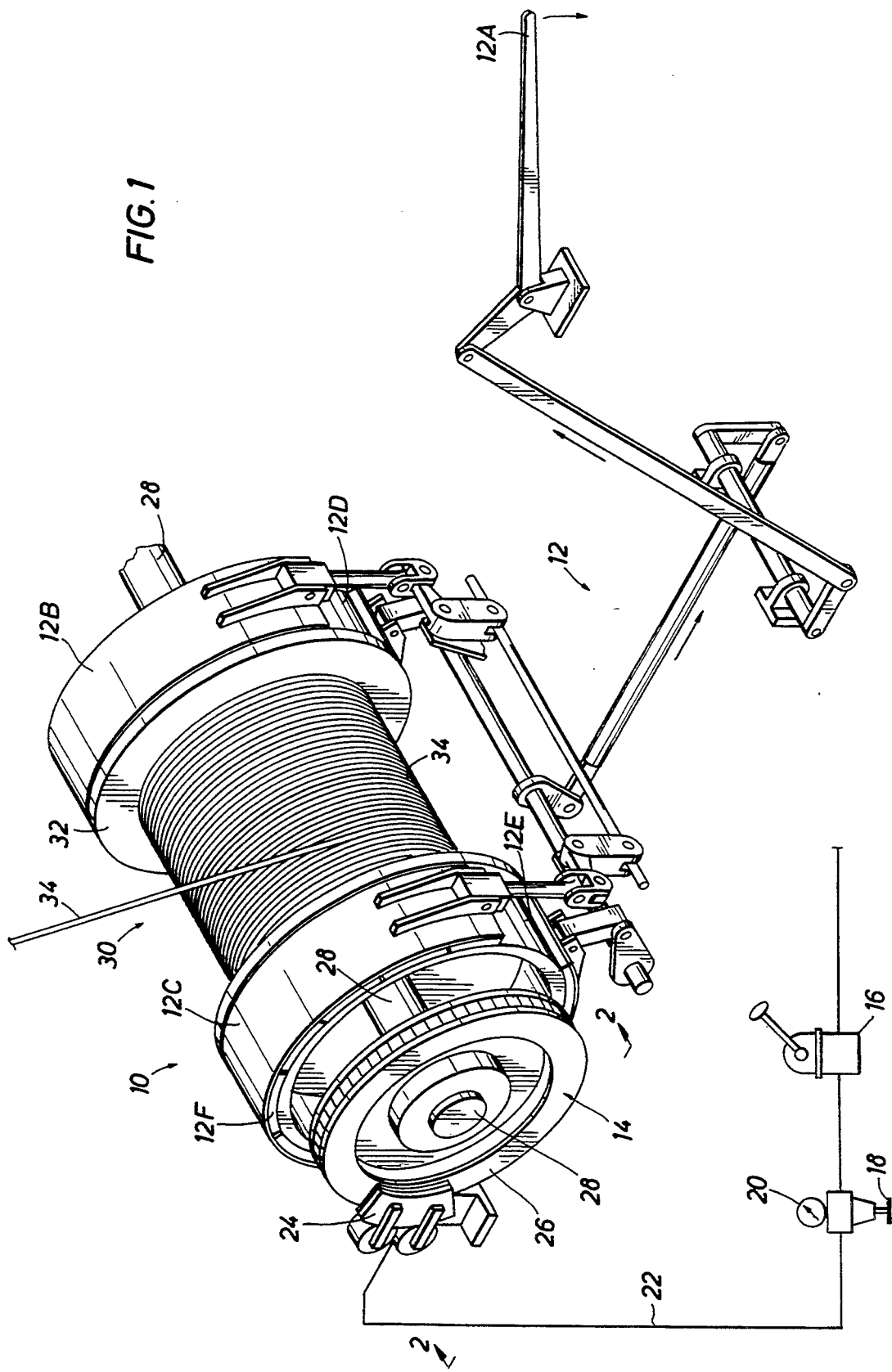
FIG. 1 is a perspective view of the braking system of the present invention including a main band brake used for stopping or holding the winch cable along with an auxiliary disk brake to control the speed the cable unwinds from the winch.

As shown in FIG. 1, the disk brake 14 is controlled by a control valve 16 and an air pressure regulator 18. A pressure gauge 20 measures and displays the air pressure in the pressure line 22. The control valve 16 provides air pressure in pressure line 22 to the disk brake caliper 24. The caliper 24 is preferably received about the disk 26 of the disk brake 14, as will be discussed in detail below.

As shown in FIGS. 1-5, a conventional main external contracting band brake 12 or "prony" brake is used for stopping the load and/or holding the load at a desired position. The operator would move the handle 12A downward, as shown by the arrow in FIG. 1, to move the bars, as shown by the arrows, to tighten the bands 12B, 12C about the brake rings 12D, 12E, respectively. The rings 12D, 12E are connected directly to a shaft 28. A winch 30 is also connected directly to shaft 28. The winch 30 includes a drum 32 and the cable 34 wound about the drum 30. The external contracting band brake 12 could use asbestos lining for gripping the rings 12E and 12D though more recently kevlor or fiberglass has been used for the brake linings 12F.

Figure 2:
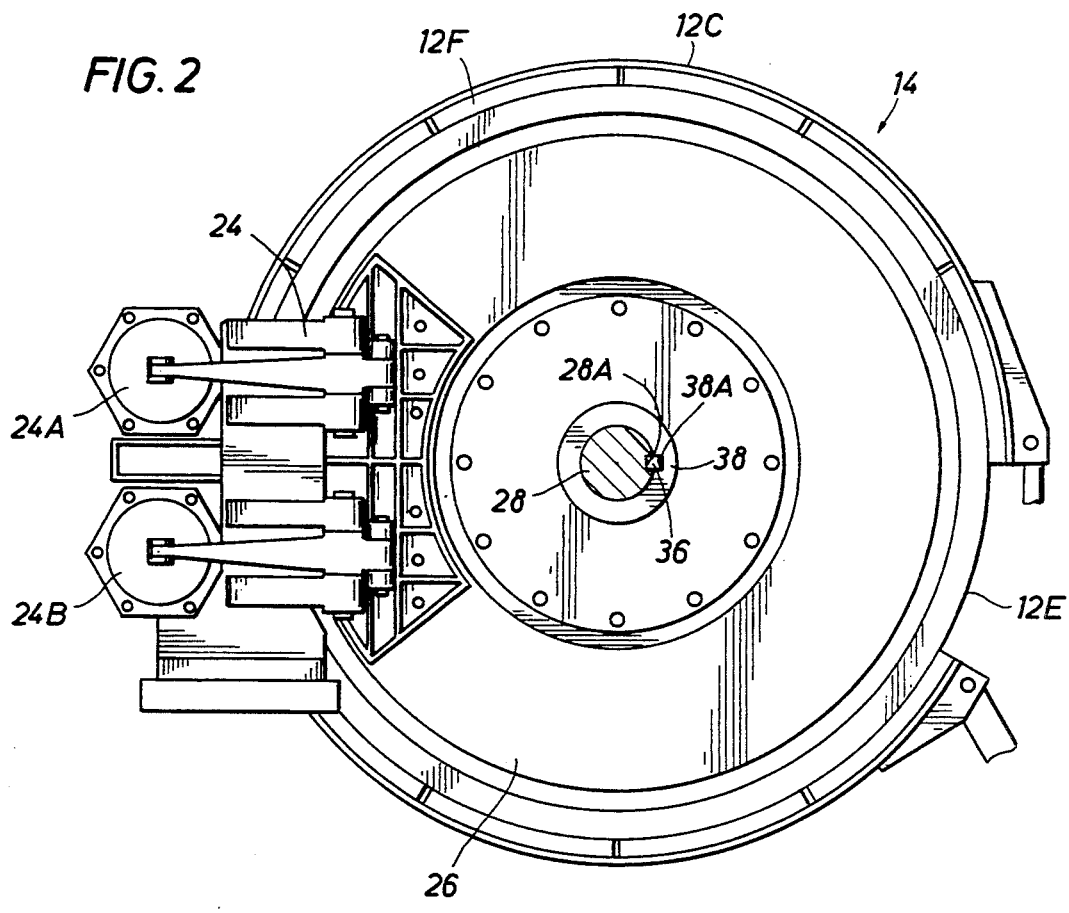
FIG. 2 is an enlarged section view of the band brake and disk brake taken along line 2—2 of FIG. 1.
Figure 3:
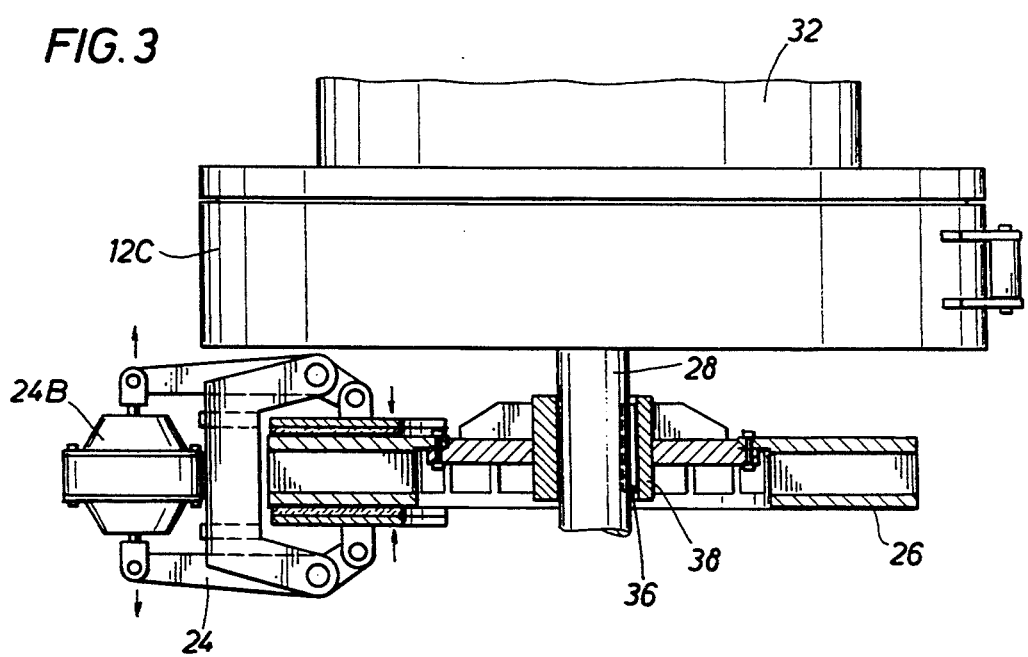
FIG. 3 is a section view of the disk brake along with a plan view of the band brake, drum and shaft of FIGS. 1 and 2.

Turning now to FIG. 2, the disk brake 14 includes a disk 26 that is received between the caliper 24. The disk 26 is connected to the shaft 28 by a key 36 received between a slot 28A in the shaft 28 and a slot 38A in the disk housing 38, as best seen in FIGS. 2 and 3, to transmit the braking force of the disk brake 14 directly to the shaft 28 and, in turn, to the winch 30. The preferred caliper, fabricated by J. Kobelt Manufacturing Company, Ltd. of Vancouver, British Columbia, Canada, is an air actuated industrial disk brake. As can best be seen in FIGS. 2 and 3, upon application of air pressure to the chambers 24A and 24B of caliper 24, the levers move, as shown by the arrows in FIG. 3, to push the brake linings in, as shown by the arrows, to engage the disk 26 on both sides. This preferred caliper 24 incorporates a balancing link interconnecting each brake shoe with its opposite control lever to equalize the pressure across the disk 26 to assure equal wear on both brake linings. The preferred disk 26, also fabricated by J. Kobelt Manufacturing Company, Ltd., is a finned air cooled disk to provide the ultimate in heat transfer and air flow.

Figure 4:
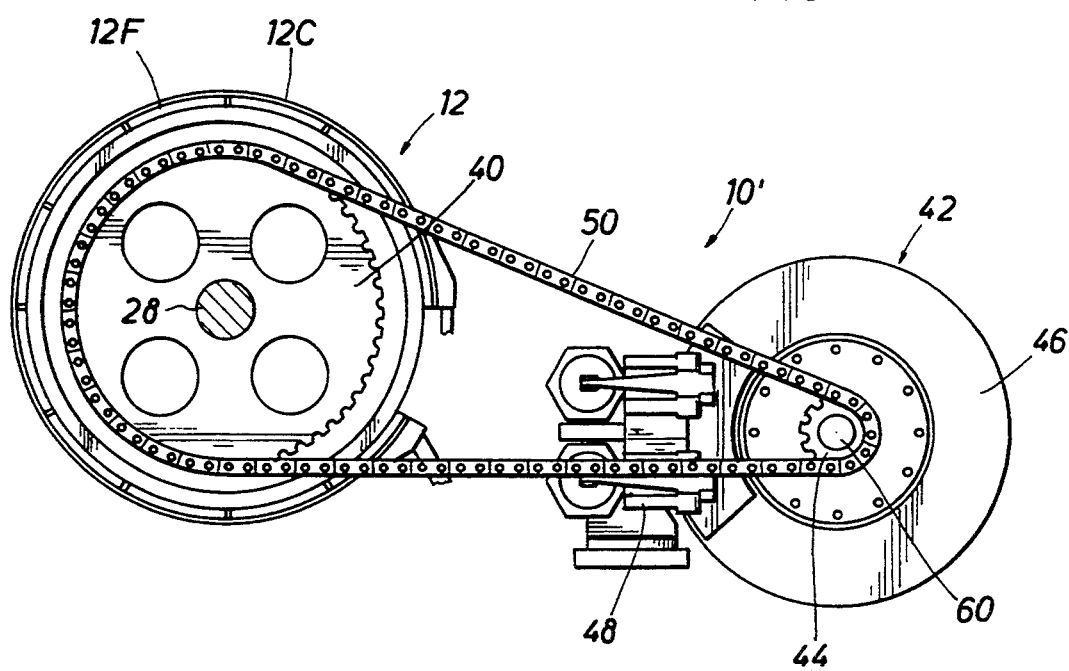
FIG. 4 is an elevational view of an alternative embodiment of the present invention with the disk brake shaft remotely positioned from the band brake shaft.

Turning now to FIG. 4, an auxiliary disk brake, generally indicated at 42, of a brake system 10', is mounted remotely from the main band brake 12. This remote positioning will allow the braking system 10' to adapt to restricted spacing requirements. As discussed above, the band brake 12 is used to stop or hold the shaft 28. A sprocket 40 is connected directly with the shaft 28. The auxiliary disk brake 42 is similar to the disk brake 14, though could be smaller in size due to the differences in size of the sprockets 40 and 44. Though the sprockets 40 and 44 are shown with relative diameters the sprockets could be of any relative diameters, i.e. the same diameter, or the diameter of sprocket 44 larger than the sprocket 42. The disk brake 44 includes a finned air cooled disk 46 with a caliper 48, similar to disk 26 and caliper 24, discussed above. A chain 50 provides a direct drive between the sprockets 40 and 42.

Figure 5:
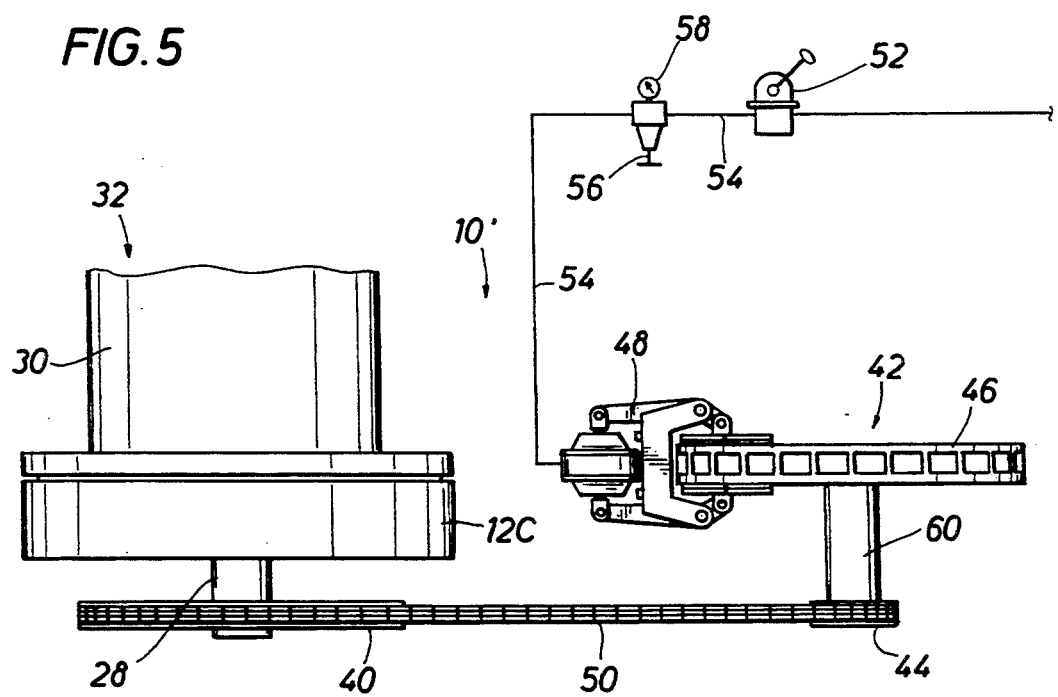
FIG. 5 is a plan view of FIG. 4 further including a schematic for the disk brake control valve and regulator.

Turning now to FIG. 5, the plan view of the braking system 10' is shown with a control valve 52 to control the air pressure in line 54 which can be regulated by air pressure regulator 56 and measured and displayed by gauge 58, similar to the control valve 16, regulator 18 and gauge 20 discussed above. The sprocket 44 is connected directly with the second or auxiliary shaft 60. The disk brake 42 is also connected directly to shaft 60 for controlling the unwinding of the cable 34 from the winch 30.

Use and Operation

The operator of the braking system 10 or 10' would move the handle 12A of the main band brake downwardly for stopping the cable from unwinding from the winch 30 or to hold a load on the cable 34. However, when a load is being lowered by the cable 34, the control valve 16 or 52 of the disk brake 14 or 42, respectively, could be applied for controlling the speed that the cable 34 unwinds from the winch 32. The operator could additionally regulate the air pressure in the line 22 or 54 to the respective brake caliper using the air pressure regulator 18 or 56 to vary the air pressure applied to the caliper to match the load being lowered by the cable 34. For example, as the load increases, the air pressure could be increased accordingly by the regulator.

The foregoing disclosure and description of the invention are illustrative and explanatory thereof, and various changes in the size, shape, and materials, as well as in the details of the illustrated construction may be made without departing from the spirit of the invention.

What is claimed is:

1. A brake system for controlling a load suspended from a cable on a winch adapted for use in an oil well operation, comprising,
    a friction brake for stopping the cable, and
    a disc brake having a pressure regulated caliper that constantly engages a disc to substantially control the rate of descent of the load when said load is being lowered, said disc brake adapted to be used independent of said friction brake for maintaining a substantially controlled constant speed that the cable unwinds from the winch.

2. The brake system of claim 1 wherein said friction brake is a band brake.

3. The brake system of claim 2 wherein said band brake is an external contracting band brake.

4. The brake system of claim 1 further comprising a remote control valve for applying the disk brake to control the speed that the cable unwinds from the winch.

5. The brake system of claim 1 further comprising a shaft wherein said friction brake and said disk brake are mounted on said shaft.

6. The brake system of claim 1 further comprising a first shaft and a second shaft wherein said friction brake is fixedly mounted on said first shaft and said disk brake is fixedly mounted on said second shaft.

7. The brake system of claim 6 wherein said first shaft and said second shaft are interengaged.

8. The brake system of claim 7 wherein a chain and sprocket assembly is used to interengage said first shaft and said second shaft.

9. The brake system of claim 1 further comprising an air pressure regulator for regulating an air pressure to said disk brake caliper.

10. The brake system of claim 9 wherein the air pressure to said disk brake caliper can be regulated to correspond to the load on the cable.

11. The brake system of claim 1 wherein said disc brake comprises a finned air cooled disc to provide heat transfer of the disc during the controlled unwinding of the cable from the winch.

12. The brake system of claim 11 wherein said disc brake caliper engages said finned disc to provide a predetermined consistent speed that the cable unwinds from the winch.

13. A brake system adapted for controlling a load suspended from a cable on a winch for an oil well operation, comprising an external contracting band brake for stopping the cable, a disc brake having a pressure regulated caliper that constantly engages a disk to substantially control the rate of descent of the load when said load is being lowered, said disc brake adapted to be used independent of said friction brake for maintaining a substantially controlled constant speed that the cable unwinds from the winch, a remote control valve for applying the disc brake to control the speed that the cable unwinds from the winch, and a shaft for connecting said band brake with said disc brake.

14. The brake system of claim 13 further comprising an air pressure regulator for regulating an air pressure to said disk brake caliper.

15. The brake system of claim 13 wherein said disc brake comprises a finned air cooled disc to provide heat transfer of the disc during the controlled unwinding of the cable from the winch.

16. The brake system of claim 15 wherein said disc brake having a fluid pressure actuated caliper to engage said finned disc to provide a predetermined consistent speed that the cable unwinds from the winch.

17. A brake system for controlling a load suspended from a cable on a winch, comprising an external contracting band brake for stopping the load, a disk brake having a caliper that constantly engages a disc to substantially control the rate of descent of the load when said load is being lowered for maintaining a substantially controlled constant speed that the cable lowers the load, a remote control valve for applying the disc brake to control the speed that the load is lowered, and an air pressure regulator for regulating an air pressure to said disc brake caliper to provide sufficient braking force to the winch relative to the load on the cable whereby additional air pressure provides additional braking force.

18. A brake system of claim 17 further comprising a first shaft and a second shaft wherein said band brake is mounted on said first shaft and said disk brake is mounted on said second shaft, said first shaft and said second shaft being interengaged by a chain and sprocket assembly.

19. The brake system of claim 17 wherein said disc brake comprises a finned air cooled disc to provide heat transfer of the disc during the controlled unwinding of the cable from the winch.

20. The brake system of claim 19 wherein said disc brake caliper is a fluid pressure actuated caliper that engages said finned disc to provide a predetermined consistent speed that the cable unwinds from the winch.

21. Method of controlling the lowering of a load attached to a cable positioned on a winch for use in an oil field operation comprising the steps of:

engaging a friction brake to stop the load;

disengaging the friction brake to allow the load to be lowered regulating the engagement of a disc brake caliper to a disk to substantially control the rate of descent of the load when said load is being lowered by applying a fluid pressure to the caliper; and maintaining a substantially controlled constant speed that the cable lowers the load using the disc caliper constantly applied to the disc when said friction brake is disengaged.

22. Method of claim 21 further comprising the step of regulating the fluid pressure to the disc brake caliper to provide sufficient braking force to the winch relative to the load.

* * * * *

US005425435B1

REEXAMINATION CERTIFICATE (4227th)

United States Patent [19]
Gregory

[11] B1 5,425,435
[45] Certificate Issued Dec. 5, 2000

[54] BRAKE SYSTEM FOR DRILLING EQUIPMENT

[75] Inventor: Truman L. Gregory, Odessa, Tex.

[73] Assignee: Gregory Rig Service & Sales, Inc., Odessa, Tex.

Reexamination Request:
No. 90/005,112, Sep. 21, 1998

Reexamination Certificate for:
Patent No.: 5,425,435
Issued: Jun. 20, 1995
Appl. No.: 08/357,523
Filed: Dec. 15, 1994

Related U.S. Application Data

[63] Continuation of application No. 08/122,325, Sep. 15, 1993, abandoned.

[51] Int. Cl.[7] .............................. F16D 51/00; B66D 5/26
[52] U.S. Cl. ................................ 188/77 W; 188/264 A; 188/72.1; 254/379
[58] Field of Search ........................... 188/77 W, 72.1, 188/204 A; 254/379

[56] References Cited

U.S. PATENT DOCUMENTS

| | | | |
|---|---|---|---|
| 1,688,599 | 10/1928 | Sage | 254/385 |
| 3,228,493 | 1/1966 | Kershner | 188/73 |
| 3,722,636 | 3/1973 | Kobelt | 188/170 |
| 4,121,697 | 10/1978 | Kobelt | 188/72.7 |
| 4,164,993 | 8/1979 | Kobelt | 188/218 XL |
| 4,457,408 | 7/1984 | Montalvo, III | 188/72.2 |
| 4,469,203 | 9/1984 | Herbulot et al. | 188/218 XL |
| 4,572,335 | 2/1986 | Kobelt | 188/72.1 |
| 4,696,377 | 9/1987 | Richardson et al. | 188/170 |
| 4,812,777 | 3/1989 | Shirai | 303/14 |
| 4,865,393 | 9/1989 | Falcon | 303/15 |

FOREIGN PATENT DOCUMENTS

| | | | |
|---|---|---|---|
| 895693 | 3/1972 | Canada | 188/34.1 |
| 922603 | 3/1973 | Canada | 188/65 |
| 1069066 | 1/1980 | Canada | 188/139 |
| 1072025 | 2/1980 | Canada | 188/149 |
| 1158181 | 12/1983 | Canada | 188/154 |
| 1176187 | 10/1984 | Canada | 188/145 |

OTHER PUBLICATIONS

Dreco Ltd., Service and Repair Man. for Model 400 PSD Drawworks, published Aug. 1984, layout drawing 9003–D–50, May 12, 1984.

"Drive–In Type Unit"; Machine: "Mogul "42" Double Drum (Jr) Winchmobile"; Customer: Pool Co.: Supply Store: Johnston–Lawrence Co.: Serial No. 10313; Job File No. 160; (1 page, both sides) KK–130 is a Kopper Kool Air–Tube Disc Brake, Mar. 27, 1969.

(List continued on next page.)

*Primary Examiner*—Mark Graham

[57] ABSTRACT

A brake system for controlling a winch cable for an oil well drilling or servicing operation includes a main external contracting band brake for stopping the cable and an auxillary disk brake for controlling the speed the cable unwinds from the winch so as to control the descent of a load on the cable.

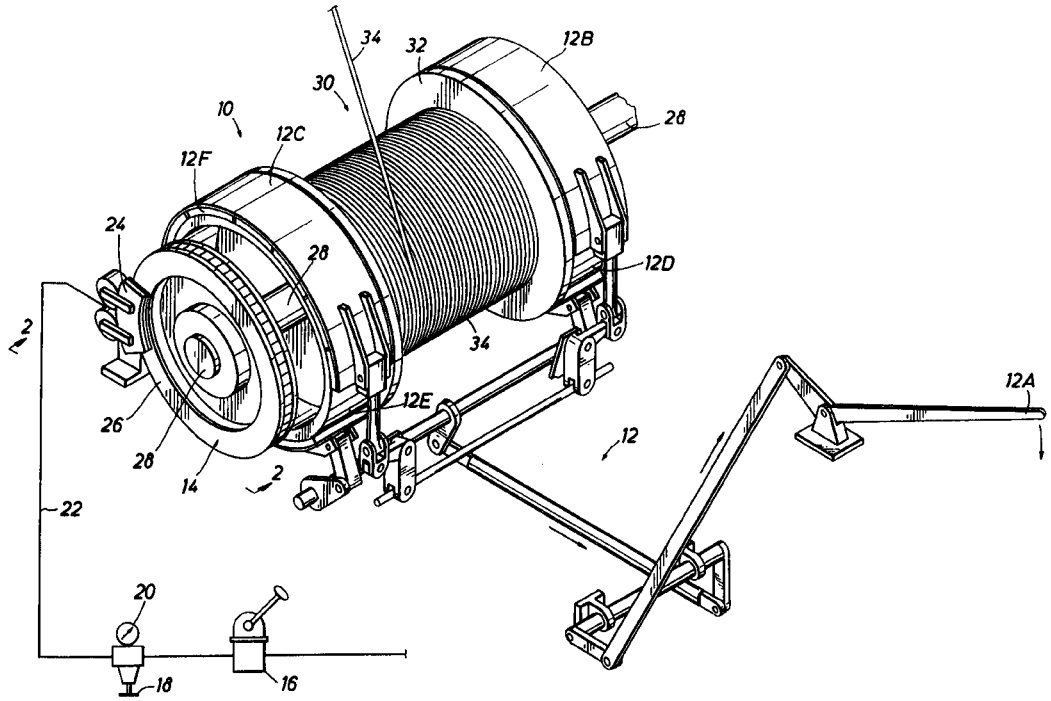

OTHER PUBLICATIONS

Dreco Ltd., Service and Rep. Man. for Mod. 1500UE Drawworks, Pub. ca. 1990 plan and assy. drwgs and pp. 1, 6, 8, 9, and unn.

Brochure: "Kopper Kool Air–Tube Disc Brake", Wichita Clutch Company, Inc. of Wichita Falls, Texas, Oct. 1974 Humphrey (4 pages).

"Drive–In Type Unit"; Machine; "Mogul "42" Double Drum (Jr) Winchmobile"; Customer: Pool Company; Supply Store: Johnston–Lawrence Co.; Serial No. 10315; Job File No.: 172; Date Delivered: Apr. 29, 1969 (1 page, both sides) KK–130 is a Kopper Kool Air–Tube Disc Brake.

Production Order No. 172 Specifications dated Feb. 28, 1969 (3 pages).

Drawing No. E–14517 from Wilson Manufacturing Co., Inc. "Schematic Air Piping Diagram Mogul 42 DD Winchmobile"; Apr. 23, 1969 (1 page).

"Drive–In Type Unit"; Machine: "Mogul "42" Double Drum (Jr) Winchmobile"; Customer: Pool Co.: Supply Store: Johnston–Lawrence Co.: Serial No. 10313; Job File No. 160; Date Delivered: Mar. 27, 1969 (1 page, both sides) KK–130 is a Kopper Kool Air–Tube Disc Brake [see above "A"].

Drawing No. A–48517 from Wilson Manufacturing Co., Inc. "Change Over from KK Brake to 15? D Parkersburge Hydromatic Brake dated Nov. 30, 1971 ("1 page).

Drawing No. E–14418 from Wilson Manufacturing Co., Inc. "Schematic Air Piping Diagram Mogul 42 DD Winchmobile", Jul. 17, 1968 (1 page).

"Drive–In Type Unit"; Machine: "Mogul "42" Double Drum (Jr) Winchmobile"; Customer: Pool Company; Supply Store: Johnston–Lawrence Co.; Serial No.: 10299; Job File No.: 122; Date Delivered: Sep. 25, 1968 (1 page, both sides) KK–130 is a Kopper Kool Air–Tube Disc Brake.

Cover Page to files from CE Mobile Equipment, Inc. regarding 130 Kopper Kool (1 page).

Drawing No. D–18379 from Wilson Manufacturing Co., Inc. "Disc Brake Torque Plate–Mogul 42 Winchmobile" dated Aug. 24, 1966 (1 page).

Drawing No. E–14418 from Wilson Manufacturing Co., Inc. "Schematic Air Piping Diagram–Mogul 42 D.D. Winchmobile" dated Oct. 3, 1968 (1 page).

Machine: "Mogul "42" Single Drum Winchmobile"; Customer: Pool Well Service; Supply Store: Jack Anderson Company; Serial No.: 10242; Job File No.: S–7545; Date Delivered: Oct. 5, 1966 (1 page, both sides).

Cover Page to files from CE Mobile Equipment, Inc. regarding ATD–230 Kopper Cool (1 page).

Drawing No. F–11014 from Wilson Manufacturing Co., Inc. "Mogul 42 S.D. Winchmobile with 126 Foot Mast", dated Apr. 30, 1966 (1 page).

Drawing No. B–21491 from Wilson Manufacturing Co., Inc. "Plan View of Winchmobile–Pool Well Service", dated Oct. 27, 1966 (1 page).

Wilson Manufacturing Co., Inc.'s Part Form for "Mogul 42 Winchmobile–Drum (Single Drive–Disc Brake)" Assembly No. E–14101, Job S–7545, Material Specification No. 6079, dated Aug. 24, 1966 (1 page).

Handwritten Notes regarding ATD–230 Brake, Job S–7545, dated Aug. 23, 1966 (1 page).

Pool Well Servicing Company Inter–Office Correspondence dated Apr. 23 to Jack Wilson from Frank & Pete regarding derrick unit (1 page).

Drawing attached to Apr. 23, 1966 Memorandum (1 page).

Wilson Manufacturing Co., Inc.'s Customer Order for Job S–7545 dated Jul. 18, 1966 (2 pages).

Drawing No. E–14132 from Wilson Manufacturing Co., Inc. "Schematic Air Piping Diagram Mogul 42 S.D. Winchmobile S–7545", dated Oct. 4, 1966 (1 page).

Brochure: "C–3 Drawworks", LTV/Continental Emsco, May, 1983 (8 pages).

Drawing No. 4–10–08–0025–0 from Dretech, Inc., entitled, "Outline & Mounting Dimensions for Dretech & Baylor Eddy Current Brakes", Apr. 6, 1984. Note: dimensions and drawing redacted in view of proprietary statement (1 page).

Brochure: "Hi–Tech 250", Hi–Tech of Sand Springs, Oklahoma, undated (1 page, both sides).

Catalog: "Ingersoll–Rand Mobilrigs", Mobile Drilling Rigs, 1982–1983 General Catalog © 1981, Ingersoll–Rand Oilfield Products Company, (24 pages).

Catalog: "IRI International Corporation—Designers and manufacturers of a complete line of drilling, workover and servicing rigs, related rig equipment and accessories", © 1986, IRI International Corporation (80 pages total including 75 numbered pages).

Catalog: "DRECO Derrick & Rig Equipment Company", 1982–83 Catalog (48 pages) In particular, see numbered pp. 2585–2592 re hydrodynamic or eddy current auxiliary brakes.

Catalog: "DRECO Derrick & Rig Equipment Company", 1984–85 Catalog (32 pages) In particular, see numbered pp. 2547–2552 re hydrodynamics or eddy current auxiliary brakes.

Catalog: "DRECO Derrick & Rig Equipment Company", 1986–87 Catalog (6 pages) In particular, see numbered pp. 1662–1667 re hydrodynamic or eddy current auxiliary brakes.

Catalog: "DRECO Energy Services Ltd.", 1988–89 Catalog (34 pages) In particular, see numbered pp. 1201–1206 re hydrodynamic or eddy current auxiliary brakes.

Catalog: "DRECO Energy Services Ltd.", 1990–91 Catalog (34 pages) In particular, see numbered pp. 1085–1099 re hydrodynamic or eddy current auxiliary brakes.

Catalog: "DRECO Energy Services Ltd.", 1992–93 Catalog (38 pages) In particular, see numbered pp. 942–954 re hydrodynamic or eddy current auxiliary brakes.

Catalog: "DRECO Energy Services Ltd.", 1994–95 Catalog (38 pages) In particular, see numbered pp. 963–976 re hydrodynamic or eddy current auxiliary brakes.

Catalog: "DRECO Energy Services Ltd.", 1996–97 Catalog (7 pages) In particular, see numbered pp. 787–791 and 807 re hydrodynamic or eddy current auxiliary brakes.

Catalog: "DRECO Energy Services Ltd.", 1998–99 Catalog (6 pages) In particular, see numbered pp. 568–572 re hydrodynamic or eddy current auxiliary brakes.

Catalog: "National–Oilwell", 1996–97 Catalog (pp. 1725, 1727 and 1728).

Catalog: "National–Oilwell", 1998–99 Catalog (pp. 1340–4 to 1340–14 and 1340–29).

Jun. 26, 1998 letter to Mr. Larry Richards of CE Mobile "Systems" Equipment, Inc. from Donald E. Harman Co. with DRECO Mar. 24, 1990 drawing entitled, "DI500UE Drum Shaft Assembly" [see Exhibit 5 of Kobelt Declaration (no corresponding reference)].

Sep. 23, 1998 letter to Mr. Richard Fladung, Esq. of Pravel, Hewitt & Kimball from Donald E. Harman Co. with the following attachments: Sep. 1, 1998 Disc Brake (Retarding Brake) Installations; DRECO Drawing No. 9006D400 dated Mar. 24, 1990 entitled, "DI500UE Drum Shaft Assembly" [see Exhibit 5 of Kobelt Declaration (no corresponding reference)]; Brochure: "Hi–Tech 250", Hi–Tech of Sand Springs, Oklahoma, undated (1 page, both sides); DRECO Drawing No. 9003–D–50 dated May 12, 1984 entitled, "Layout—400PSD with 5040 Caliper, D343, 8 CLT 754" [see Exhibit 1 of Kobelt Declaration (reference CA)]; DRECO Drawing No. 9005–D–177 dated Jul. 16, 1985 entitled, Layout—1000 c/w Disc Brake; 2 Cat 3408 [see Exhibit 2 of Kobelt Declaration (reference CB)]; DRECO Drawing No. 9002–D–167 dated Jan. 13, 1986 entitled, "Low Profile 700UE/w GE 752 Motor 8 Nat. C275 Table" [see Exhibit 3 of Kobelt Declaration (reference CC)].

HITEC–DRECO Drawing No. 9006–D101, date illegible, entitled, "Planview DI1500UE Drawworks" [see Exhibit 4 of Kobelt Declaration (reference CD)].

Brochure: "Fluid Actuated and Fail Safe Disc Brakes", Kobelt Manufacturing Company Limited © 1988 (7 pages) Note list of U.S. Patents and Canadian Patents on p. 2.

"Disc Brake Selection" by Kobelt Manufacturing (1 page).

Brochure: "Kobelt Air Cooled Disc Brakes for Drawworks", Kobelt Manufacturing Company Limited © 1982 (2 pages) Note list of U.S. Patents and Canadian Patents on p. 2.

Brochure: "Kobelt Disc Brakes—Accepting the Challenge Made Us No. 1 in the Disc Brake Industry!", Kobelt Manufacturing Company Limited © 1989 (12 pages, including 8 numbered pages) Note list of U.S. Patents and Canadian Patents (see six Canadian patents provided above) on numbered p. 1.

Brochure: "Wichita Tension Brakes Very High Heat Capacity" Wichita Clutch © 1995 (cover page and pp. 60–61) Wichita CLutch of Wichita Falls, Texas.

Brochure: "Airflex Clutches & Brakes—WCB Brakes—Designed for Continuous Slip Service, These Unites Can Absorb and Dissipate the Thermal Loads Found in Severe Applications.", Eaton Corporation—Airfex Divisions © 1994 (8 pages).

"Installation, Operation and Maintenance Instructions Modes 6032 Eddy Current Brake with Model 4900 Control System: Section 4—Theory of Operation", Baylor Company of Houston, Texas (no date) (5 pages—coversheet and numbered pp. 4–1 to 4–3 and drawing of Figure 2–1).

Drawing No. 005–08–0009, "Outline and Mounting Dimensions Model 19RD130" dated Feb. 7, 1992 [see above reference G regarding 19RD130–eddy current brake].

Press Release of May 14, 1997 entitled: "National–Oilwell and Dreco Announce Signing of Definitive Combination Agreement" taken from National–Oilwell web–site: www-.corporate–ir.net/ireye/ir_site.zhtml?ticker=noi&script=410&layout=7&item_id=13409.

Press release of Sep. 24, 1997 entitled: "Combination of National–Oilwell and Dreco Approved" taken from National–Oilwell web–site: www.corporate–ir.net/ireye/ir_site.zhtml?ticker=noi&script=410&layout=7&item_id=13481.

Press Release of Sep. 25, 1997 entitled: "National–Oilwell and Dreco Combination Completed" taken from National–Oilwell web–site: www.corporate–ir.net/ireye/ir_site.zhtml?ticker=noi&script=410&layout=7&item_id=13484.

Dreco Ltd., Service and Repair Manual for Model 400 PSD Drawworks, Published Aug. 1984, layout drawing 9003–D–50, dated May 12, 1984.

Dreco Ltd., Service and Repair Manual for Model 1000 Series Drawworks, Pub. 1985, layout drawing 9005–D–177, dated Jul. 16, 1985.

Dreco Ltd., Service and Repair Manual for Model 700UE Drawworks, Published 1986, layout drawing 9002–D–167, dated Jan. 13, 1986.

Dreco Ltd., Service and Rep. Man. for Mod. 1500UE Drawworks, Pub. ca. 1990, plan and assy. drwgs and pp. 1, 6, 8, 9, and unn.

Dreco Ltd., Service and Repair Manual, Crown–Saver Air Schematic, dated Jun. 5, 1995.

Hitec–Dreco, Drilling Mast, Substructure, and Mud Treatment for Planview D1500UE Drawworks, Dreco drawing 9006–D101, dated Aug. 23, 1990.

Dreco Ltd., Layout–1000 c/w Disc Brake; 2 CAT 3408, Dreco drawing No. 9005–D–177–Rev. 2, dated Jul 16, 1985.

Dreco Ltd., Layout–400PSD with 5040 Caliper, D343, & CLT 754, Dreco drawing No. 9003–D–50–Rev. 0, dated May 12, 1984.

Dreco Ltd., Low Profile 700UE/w GE 752 Motor & Nat. C275 Table, Dreco drawing No. 9002–D–167–Rev. 8, dated Jan. 13, 1986.

Dreco Drilling Machinery, Crown–Saver Air Schematic With Manual Overide, Dreco drawing No. 43097079, dated Jun. 5, 1995.

Dreco Drilling Machinery, Plan View D1500UE Drawworks, Dreco drawing No. 9006D101, dated Jan. 9, 1992.

Dreco Manual, "DEUTAG Rig T–43 700UE—Dreco Drilling Machinery S/N: 149"; Bates Numbers NOW 00001–69. In particular, see NOW 00005 Dreco Ltd., 700UE Drawworks Power Flow, drawing no. 9002–D–177, dated Mar. 13, 1986; NOW 00010 Section II, Operating Instructions, A.1) Emergency Stop Control; NOW 00013, A.17) Disc Brake Release Air Gauge, 18) Disc Brake Air Regulator, and 19) Disc Feed–Off Control; NOW 00017–18 C. Electric Brake, "Typical Operations"; and NOW 00020 E. Disc Braking System.

Dreco Manual for the DEUTAG T–61 1000M—DRECO Drilling Machinery S/N: 144; Bates Numbers NOW00070–129. In particular, see NOW 00075 Dreco Ltd., 1000 M Power Flow, drawing no. 9005–D–189, dated Aug. 20, 1986; NOW 00078, Section II—Driller's Controls (Refer to Drawing No. 9005–D–186), Item Nos.: 8. Disc Feed Off Control, 9. Disc Feed–Off Regulator, 3. Disc Brake Feed Off Pressure Gauge, and 6. Emergency Stop; NOW 00082, Section IV—Water Brake; and NOW 00086 Disk Brake Test I—Flow Rate vs. Pressure dated Jun. 4, 1986.

Dreco Manual; Bates Numbers NOW 00130–308. In particular, see NOW 00131 Dreco Ltd., Low Profile 75OUE w/ Toshiba Motor & Dreco 27½ Table, drawing no. 9002–D226, dated Jan. 13, 1990; NOW 00143 Dreco Ltd., Drum Shaft Mounted Disc Brake, drawing no. 9002–E–22, dated May 1986; NOW 00172–174 Brochure of Kobelt Manufacturing Co. Ltd. "Air Applied Disc Brakes Caliper No. 5040 Industrial Brake" (see "Other Publications" in cited references of '435 patent); NOW 00175–176 Brochure of Kobelt Manufacturing Co. Ltd. "5022–A Fluid Applied Brake Caliper" © 1988; NOW 00177–180 Brochure of Kobelt Manufacturing Co. Ltd., "Maintenance and Installation Instructions for All Kobelt Disc Brakes".

Dreco Ltd., Drum Shaft Mounted Disc Brake, Dreco drawing no. 9002–E–22, dated May 1986 (see above NOW 00143).

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–22 are cancelled.

\* \* \* \* \*